United States Patent Office 3,062,839
Patented Nov. 6, 1962

3,062,839
DIHYDROXY-TERTIARY-BUTYLAMINES
Bola Vithal Shetty, Rochester, N.Y., and William F. Bruce, Havertown, and Meier E. Freed, Philadelphia, Pa., assignors to American Home Products Corporation, New York, N.Y., a corporation of Delaware
No Drawing. Filed June 11, 1959, Ser. No. 819,538
6 Claims. (Cl. 260—347.7)

This invention relates to amino compounds and more particularly to heterocyclic and aromatic tertiary butyl amine derivatives.

The compounds of the invention may be represented by the general formula

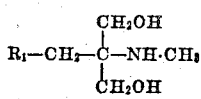

wherein $R_1$ represents furyl, phenyl or substituted phenyl. Substituents on the phenyl ring may comprise one, two or three radicals, in the ortho, meta and/or para position and may be either alkyl, alkoxy, halogen, hydroxy or amino groups. Included as a part of the invention are the pharmaceutically acceptable, non-toxic acid-addition salts of the aforesaid bases.

In general, the compounds are prepared by reacting an ethyl acylamino-malonate with an alkali-metal, for example, sodium to form the alkali-metal derivative, the reaction product then being alkylated with furfuryl, benzyl or substituted benzyl halide and the alkylate then being reduced with lithium aluminum hydride in a suitable solvent, for example, ether to form the desired base.

The salts may be prepared in the usual manner from the bases, utilizing organic or inorganic acids selected to produce salts that are non-toxic at the therapeutic dosage range.

The following examples illustrate the preparation of specific compounds.

EXAMPLE 1

*N-Methyl-Omega-Furyl-Omega′,Omega″-Dihydroxy-Tert.Butylamine Hydrochloride*

In a 1-l., three-necked, round-bottomed flask, fitted with a stirrer, a dropping funnel and a condenser protected from atmospheric moisture, were placed 200 ml. of absolute ethanol and 1.86 g. (0.081 g. atom) of sodium under an atmosphere of pure dry nitrogen. When the sodium was completely dissolved, 24.0 g. (0.081 mole) of ethyl formylamino malonate was added and stirred for 15 minutes. Then, with stirring, 17.0 g. (0.15 mole) of furfuryl chloride was added dropwise during a period of 10 minutes. With stirring, it was refluxed for 15 minutes. Filtered while hot and from the filtrate, ethanol was removed under reduced pressure. The product, ethyl α-formylamino-α-carbethoxy-β-furylpropionate, was recrystallized twice from acetone and water and dried in vacuo. M.P. 95–96° C.

Analysis.—Calcd. for $C_{13}H_{17}O_6N$: C, 55.12; H, 6.00; N, 4.94. Found: C, 55.12; H, 5.62; N, 5.22.

In a 1-l., three-necked, round-bottomed flask equipped with a stirrer, a separatory funnel and a condenser protected from atmospheric moisture, were placed 150 ml. of absolute ether and 5.85 g. (0.154 mole) of lithium aluminum hydride under an atmosphere of pure dry nitrogen. It was stirred for 20 minutes and then with cooling in an ice bath, 13.0 g. (0.046 mole) of ethyl α-formyl-amino-α-carbethoxy-β-furylpropionate, suspended in 200 ml. of absolute ether, was added portionwise during a period of 20 minutes. Then with stirring, it was refluxed on a steam bath for 6 hours. The reaction mixture was cooled in an ice bath and decomposed with excess of water. The ether layer was separated and the aqueous layer was extracted with five 50 ml. portions of ether. The combined extracts were dried over anhydrous sodium sulfate, filtered, and from the filtrate ether was removed under reduced pressure. The base was converted into a hydrochloride by dissolving in 100 cc. of absolute ether, cooling in an ice bath and passing dry hydrogen chloride into the solution. It was filtered by suction and the solid was recrystallized from absolute methanol and ether. M.P. 161–163° C.

Analysis.—Calcd. for $C_9H_{16}O_3NCl$: C, 48.75; H, 7.22; Cl, 16.02; N, 6.32. Found; C, 48.82; H, 6.96; Cl, 15.90; N, 6.11.

EXAMPLE 2

*N-Methyl-Omega-Phenyl-Omega′,Omega″-Dihydroxy-t-Butylamine hydrochloride*

In a 2-l. three-necked, round-bottomed flask, equipped with a mechanical stirrer, a thermometer, a condenser connected to a tube containing layers of potassium hydroxide-calcium chloride and a dropping funnel, are placed 470 ml. of absolute ether and 19.9 g. (0.52 mole) of lithium aluminum hydride. This is stirred for 20 minutes at room temperature and then for 20 minutes while cooling in an ice bath under an atmosphere of pure dry nitrogen. Then 50.0 g. (0.17 mole) of ethyl α-formylamino-α-carbethoxy-β-phenylpropionate, suspended in 250 ml. of absolute ether, is added portionwise during 45 minutes, maintaining the temperature below 30° C. After the addition is complete, the stirring and refluxing is continued for 6 hours. It is cooled in an ice bath and the reaction mixture is decomposed with water. The ether layer is separated and the aqueous layer is extracted with eight 100 ml. portions of warm ether. The combined ether solution is dried over anhydrous sodium sulfate, filtered, and the ether is removed under reduced pressure. The base is converted into a hydrochloride by dissolving in 300 ml. of absolute ether and passing in dry hydrogen chloride while cooling in an ice bath. It is filtered, washed with four 100 ml. portions of ether and the residue is dried under vacuum. It is recrystallized by dissolving in 100 ml. of absolute methanol, digesting with 1.0 g. animal charcoal, and filtering while hot. The filtrate is concentrated to 70 ml. and then 50 ml. of acetone followed by 300 ml. of absolute ether are added. This mixture is allowed to stand in a refrigerator at —10° overnight. The solid is filtered off and dried under vacuum. M.P. 153–155° C.

Analysis.—Calcd. for $C_{11}H_{18}ClNO_2$: C, 57.02; H, 7.77; Cl, 15.31; N, 6.04. Found: C, 56.95; H, 7.44; Cl, 15.51; N, 6.22.

EXAMPLE 3

*N-Ethyl-Omega-Phenyl-Omega′,Omega″-Dihydroxy-t-Butylamine Hydrochloride*

In a 1 liter three-necked, round-bottom flask, equipped with a stirrer, a dropping funnel, a thermometer, and a condenser connected to a tube containing layers of potassium hydroxide-calcium chloride, are placed 120 ml. of anhydrous ether and 4.21 grams (0.111 mole) of lithium aluminum hydride under an atmosphere of pure dry nitrogen. The mixture is stirred for 20 minutes at room temperature and for 20 minutes while cooling in an ice bath. With stirring, 25.0 grams (0.081 mole) of diethyl benzylacetamidomalonate, suspended in 200 ml. of anhydrous ether, is added portionwise during a period of 45 minutes, maintaining the temperature below 30° C. The refluxing and stirring is continued for 6 hours. The reaction mixture is cooled in an ice bath and decomposed with water. The ether layer is separated and the aqueous layer is extracted with three 100 ml. portions of ether. The combined ether extracts are dried over anhydrous sodium sulfate. It is then filtered and the ether is removed under reduced pressure. The base is dissolved in 300 ml. of anhydrous ether, cooled in an ice bath and dry hydrogen chloride is passed in. The oily layer is separated, dissolved in 100 ml. of water, cooled in an ice bath and filtered. The filtrate is made alkaline with 20% sodium hydroxide solution and extracted with five 50 ml. portions of ether. The combined ether extracts are dried over anhydrous sodium sulfate and filtered. The filtrate is cooled in an ice bath and dry hydrogen chloride is passed in. An oily layer is again formed. It is crystallized by dissolving in 100 ml. of acetone, digesting with 0.5 gram of animal charcoal and filtering. The filtrate is concentrated to 50 ml. and allowed to stand at −15° for one week when it partly solidifies. M.P. 141–143° C.

Analysis.—Calcd. for $C_{12}H_{20}ClNO_2$: C, 58.68; H, 8.15; Cl, 14.42; N, 5.71. Found: C, 58.52; H, 8.27; Cl, 14.17; N, 5.91.

EXAMPLE 4

N-Methyl-Omega-p-Anisyl-Omega',Omega''-Dihydroxy-Butylamine Hydrochloride

In a 1 liter three-necked round-bottom flask, equipped with a mechanical stirrer, a condenser connected to a tube containing layers of potassium hydroxide and anhydrous calcium chloride and a dropping funnel, are placed 170 ml. of anhydrous ether and 6.44 grams (0.17 atom) of lithium aluminum hydride. This is stirred for 20 minutes at room temperature and for 20 minutes while cooling in an ice bath under an atmosphere of pure dry nitrogen. With stirring, 18.0 gram (0.055 mole) of ethyl - α - formamido - α - carbethoxy - β - p - anisylpropionate, suspended in 300 ml. of anhydrous ether, is added, portionwise during a period of 45 minutes, maintaining the temperature below 30° C. After the addition is complete, the stirring and refluxing is continued for 6 hours. It is cooled in an ice bath and the reaction mixture is decomposed with water. The ether layer is separated and the aqueous layer is extracted with seven 100 ml. portions of warm ether. The combined ether extracts are dried over anyhydrous sodium sulfate, filtered and the ether is removed under reduced pressure. The base is converted to a hydrochloride by dissolving in 500 ml. of anhydrous ether, cooling in an ice bath and passing in dry hydrogen chloride. The solid is filtered and dried under vacuum. It is crystallized by dissolving in 40 ml. of absolute methanol, digesting with 0.5 gram of animal charcoal, filtering, cooling and adding 400 ml. of anhydrous ether. It is cooled again overnight in a refrigerator at −10° C and the solid crystal is filtered and dried under vacuum. M.P. 168–170° C.

Analysis.—Calcd. for $C_{12}H_{20}ClNO_3$: C, 55.08; H, 7.65; Cl, 13.54; N, 5.35. Found: C, 55.00; H, 7.80; Cl, 13.49; N, 5.65.

EXAMPLE 5

N-Methyl-Omega-3,4-Dimethoxyphenyl-Omega', Omega''-Dihydroxy-Tert.-Butylamine Hydrochloride In a 1 liter three-necked, round-bottomed flask, equipped with a mechanical stirrer and a condenser connected to a calcium chloride tube, were placed 235 ml. of absolute ethanol and 2.8 grams (0.12 atom) of sodium and the mixture was stirred under an atmosphere of pure dry nitrogen. When the sodium was completely dissolved, 25.0 grams (0.12 mole) of ethyl formylaminomalonate was added and the solution was stirred for 20 minutes. Then, 34.48 g. (0.18 mole) of finely powdered 3,4-dimethoxybenzyl chloride was added during a period of 10 minutes and the stirring and refluxing was continued for one hour. The solution was filtered hot and the residue was washed with two 50 ml. portions of boiling absolute ethanol. From the combined filtrate, ethanol was evaporated under diminished pressure. The resulting sticky solid was recrystallized twice by dissolving in 140 ml. of acetone, digesting with 0.5 gram of animal charcoal, filtering, cooling and precipitating with 250 ml. of water while cooling in an ice-bath. The solid, ethyl-α-formylamino - α - carbethoxy - β - 3,4-dimethoxyphenylpropionate, was filtered and dried over anhydrous sodium sulfate under vacuum to a constant weight. M.P. 92–94° C.

Analysis.—Calcd. for $C_{17}H_{23}NO_7$: C, 57.79; H, 6.51; N, 3.96. Found: C, 57.80; H, 6.07; N, 4.16.

In a 1 liter three-necked, round-bottomed flask, fitted with a mechanical stirrer, a reflux condenser protected from atmospheric moisture and carbon dioxide, a thermometer and a dropping funnel, were placed 145 ml. of anhydrous ether and 5.14 grams (0.13 mole) of lithium aluminum hydride (95 percent purity) and stirred for 220 minutes at room temperature and for 20 minutes while cooling in an ice-bath. Then, 16.0 grams (0.04 mole) of ethyl-α-formylamino-α-carbethoxy-β-3,4-dimethoxy-phenylpropionate, suspended in 200 ml. of anhydrous ether, was added portionwise during a period of 45 minutes, maintaining the temperature below 30° C and the stirring and refluxing was continued for 6 hours. The reaction mixture was cooled in an ice-bath and decomposed with water. The ether layer was separated and the aqueous layer was extracted with six 50 ml. portion of boiling ether. The combined extracts were dried over anhydrous sodium sulfate, filtered, and the solvent was removed under reduced pressure. The base was extracted with 150 ml. of 10% hydrochloric acid, digested with 0.5 gram of animal charcoal, filtered and from the filtrate, water was removed under reduced pressure. The gummy product was dried in vacuo over sodium sulfate. It was crystallized from acetone and ether, and dried under vacuum. The product was gummy and very hygroscopic.

EXAMPLE 6

N-Methyl-Omega-o-Tolyl-Omega',Omega''-Dihydroxy-Tert.Butylamine Hydrochloride

In a 500 ml. three-necked, round-bottomed flask, equipped with a mechanical stirrer, a dropping funnel and a condenser protected from atmospheric moisture, were placed 173 ml. of absolute ethanol and 2.07 g. (0.09 gram atom) of finely cut metallic sodium under an atmosphere of pure dry nitrogen. When the sodium was completely dissolved, 15.0 g. (0.09 mole) of ethyl formylaminomalonate was added and stirred for 10 minutes. Then, with stirring, 19.5 g. (0.13 mole) of o-methylbenzyl chloride was added dropwise during a period of 10 minutes. The stirring and refluxing were continued for 1 hour. It was filtered while hot and the residue was washed with two 25 ml. portions of boiling ethanol. From the combined filtrates, ethanol was removed under reduced pressure. It was recrystallized by dissolving in 50 ml. of boiling acetone, filtering, cooling and precipitating with 500 ml. of water. The solid product, ethyl α-formylamino-α-carbethoxy-β-o-tolylpropionate, was filtered and dried in vacuo over anhydrous calcium chloride to a constant weight. M.P. 92–94° C.

Analysis.—Calcd. for $C_{16}H_{21}NO_5$: C, 62.54; H, 6.84; N, 4.56. Found: C, 62.60; H, 7.03; N, 4.67.

In a 1 liter three-necked, round-bottomed flask, equipped with a mechanical stirrer, a dropping funnel, a thermometer and a condenser protected from atmospheric moisture and carbon dioxide, were placed 190 ml. of anhydrous ether and 7.0 g. (0.184 mole) of lithium aluminum hydride and stirred for 15 minutes at room temperature and for 15 minutes while cooling in an ice bath under an atmosphere of pure dry nitrogen. Then, with stirring, 18.0 g. (0.058 mole) of ethyl-α-formylamino-α-carbethoxy-β-o-tolylpropionate, suspended in 300 ml. of absolute ether, was added portionwise during a period of 30 minutes maintaining the temperature below 30° C.

The stirring and refluxing were continued for 6 hours. The reaction mixture was cooled in an ice bath and decomposed with water. The ether layer was separated and the aqueous layer was extracted with five 50 ml. portions of warm ether. The combined extracts were dried over anhydrous sodium sulfate, filtered and the ether was evaporated under reduced pressure. The base, N-methyl-omega-o-tolyl-omega', omega''-dihydroxy-t-butylamine, was converted into a hydrochloride by dissolving in 250 ml. of absolute ether, cooling in an ice bath and passing in dry hydrogen chloride. The ether was decanted from the oily product and dried in vacuo. The sticky solid was recrystallized by dissolving in 100 ml. of absolute methanol, digesting with 1.0 g. of animal charcoal, filtering, cooling in an ice bath and precipitating with 350 ml. of absolute ether. The solid was removed by filtration and recrystallized again by dissolving in 60 ml. of absolute methanol, digesting with 1.0 g. of animal charcoal, filtering, cooling in an ice bath and precipitating with 600 ml. of anhydrous ether. The solid was removed and dried in vacuo over phosphorus pentoxide at 56° C. M.P. 163–165° C.

*Analysis.*—Calcd. for $C_{12}H_{20}ClNO_2$: C, 58.65; H, 8.14; Cl, 14.42; N, 5.70. Found: C, 58.75; H, 8.24; Cl, 14.40; N, 5.87.

In the same manner, but using the appropirate methyl benzyl halide, the meta- and the para-tolyl compounds may be prepared according to the procedure of this example.

EXAMPLE 7

*N-Methyl-Omega-p-Chlorophenyl-Omega',Omeaga''-Dihydroxy-Tert.Butylamine Hydrochloride*

In a 1 liter three-necked, round-bottomed flask, equipped with a mechanical stirrer, a reflux condenser protected from atmospheric moisture with a calcium chloride tube, and a dropping funnel, were placed 463 ml. of absolute ethanol and 5.6 grams (0.24 atom) of sodium and the resulting mixture was stirred for 30 minutes under an atmosphere of pure dry nitrogen. When the sodium was completely dissolved, 50.0 grams (0.24 mole) of ethyl formylaminomalonate was added and stirred for 10 minutes. Then, with stirring, 57.96 grams (0.36 mole) of α,p-dichlorotoluene was added dropwise during a period of 30 minutes and the stirring and refluxing was continued for 50 minutes. The solution was filtered hot and the residue was washed with 25 ml. of boiling ethanol. From the combined filtrates, ethanol was evaporated under diminished pressure. The product, ethyl-α-formylamino-α-carbethoxy-β-p-chlorophenylpropionate, is a thick syrup. $\alpha_D{}^n = 1.5621$.

In a 1 liter three-necked, round-bottomed flask, fitted with a stirrer, a thermometer, a dropping funnel and a condenser protected from atmospheric moisture and carbon dioxide, were placed 235 ml. of anhydrous ether and 8.91 grams (0.235 mole) of lithium aluminum hydride (95 percent purity) and the mixture was stirred for 20 minutes at room temperature and for 20 minutes while cooling in an ice-bath under an atmosphere of pure dry nitrogen. With stirring, 25.0 grams (0.076 mole) of ethyl α-formylamino-α-carbethoxy-β-p-chlorophenyl propionate dissolved in 250 ml. of anhydrous ether was added dropwise during a period of 45 minutes, maintaining the temperature below 30° C, and the stirring and refluxing was continued for 6 hours. The reaction mixture was cooled in an ice-bath and decomposed with water. The ether layer was separated and the aqueous layer was extracted with six 100 ml. portions of warm ether. The combined ether extracts were dried over anhydrous sodium sulfate, filtered, and the ether was evaporated under reduced pressure. The base was converted to a hydrochloride by dissolving in 250 ml. of anhydrous ether, cooling in an ice-bath and passing dry hydrogen chloride into the solution. The ether was decanted and the sticky product was dried in vacuo. It was dissolved in 100 ml. of water, filtered, and the water was removed under reduced pressure. The product was dried over anhydrous sodium sulfate under vacuum to a constant weight. It was recrystallized by dissolving in 40 ml. of absolute methanol, filtering and adding 100 ml. of absolute ether while cooling in an ice-bath. The colorless crystals were filtered and dried under vacuum. The colorless product was recrystallized once from water and once from absolute ethanol. M.P. 169–170° C. The picrate melted at 128–130° C.

*Analysis.*—Calcd. for $C_{17}H_{19}ClN_4O_9$: C, 44.51; H, 4.14; Cl, 7.73; N, 12.21. Found: C, 44.90; H, 4.10; Cl, 7.71; N, 12.14.

EXAMPLE 8

*N-Methyl-Omega-p-Aminophenyl-Omega',Omega''-Dihydroxy-Tert.-Butylamine Di-Hydrochloride*

In a 500 ml. three-necked, round-bottomed flask, fitted with a mechanical stirrer and a reflux condenser protected from atmospheric moisture, were placed 139 ml. of absolute ethanol and 1.67 g. (0.073 atom) of finely cut metallic sodium under an atmosphere of pure dry nitrogen. When the sodium was completely dissolved, 15.0 g. (0.073 mole) of ethyl formylaminomalonate was added and stirred for 15 minutes. With stirring, 18.7 g. (0.109 mole) of finely powdered p-nitro benzyl chloride was added during a period of 15 minutes. A thick precipitate was formed. In order to facilitate stirring, 50 ml. of absolute ethanol was added. The stirring and refluxing were continued for 50 minutes. It was filter while hot. The residue in the Buchner funnel was washed with two 25 ml. portions of water and dried in vacuo over anhydrous sodium sulfate. It was recrystallized by dissolving in 800 ml. of boiling acetone, digesting with 1.0 g. of animal charcoal, filtering and concentrating to 100 ml. It was precipitated by adding 1 liter of water while cooling in an ice bath. The solid product, ethyl α-formylamino-α-carbethoxy-β-p-nitrophenylpropionate, was filtered and dried in vacuo over anhydrous sodium sulfate to a constant weight. M.P. 188–190° C.

*Analysis.*—Calcd. for $C_{15}H_{18}N_2O_7$: C, 53.25; H, 5.32; N, 8.28. Found: C, 53.39; H, 5.64; N, 8.49.

A suspension of 5.0 g. of ethyl α-formylamino-α-carbethoxy-β-p-nitrophenylpropionate in 80 ml. of absolute ethanol was hydrogenated in a Parr shaker under 50 lbs. of hydrogen in the presence of 0.3 g. of Adams catalyst while heating the reaction bottle with an infrared lamp. Hydrogenation was completed in 3 hours. The catalyst was removed by filtration and the clear solution was cooled in an ice-bath and treated with dry hydrogen chloride. The precipitate, ethyl α-formylamino-α-carbethoxy-β-p-aminophenylpropionate hydrochloride, was removed and dried in vacuo. M.P. 214–215° C.

*Analysis.*—Calcd. for $C_{15}H_{21}ClN_2O_5$: C, 52.24; H, 6.09; Cl, 10.30; N, 8.12. Found: C, 51.99; H, 6.30; Cl, 10.30; N, 7.86.

In a 500 ml. three-necked, round-bottomed flask, equipped with a mechanical stirrer, a thermometer, a dropping funnel and a condenser protected from carbon dioxide and atmospheric moisture, were placed 2.0 g. (0.052 mole) of lithium aluminum hydride and 50 ml. of tetrahydrofuran under an atmosphere of pure dry nitrogen. It was stirred for 20 minutes at room temperature and then 2.0 g. (0.006 mole) of ethyl α-formylamino-α-carbethoxy-β-p-aminophenylpropionate, suspended in 25 ml. of tetrahydrofuran, was added portionwise during a period of 25 minutes. The stirring and refluxing were continued for 11 hours. The reaction mixture was cooled in an ice-bath and sufficient water was added cautiously to decompose the excess hydride. This was followed by 100 ml. of 10 percent sodium hydroxide solution. The tetrahydrofuran layer was separated and combined with four further tetrahydrofuran washings of 50 ml. each and dried over anhydrous sodium sulfate. It was filtered and the tetrahydrofuran was removed under reduced pressure.

The oily base was converted into a hydrochloride by dissolving in anhydrous ether, cooling in an ice-bath and saturating with dry hydrogen chloride. The ether was decanted and the oily sticky product was dried in vacuo. It could not be induced to solidify.

EXAMPLE 9

*N-Methyl-Omega-p-Hydroxyphenyl-Omega',Omega"-Dihydroxy-t-Butylamine Hydrochloride*

To one gram (0.0038 mole) of N-methyl-omega-p-anisyl-omega',omega"-dihydroxy-t-butylamine hydrochloride in 5 ml. of boiling glacial acetic acid, 2 ml. of 48 percent hydrobromic acid was added during 5 minutes. The reaction was stopped after 20 minutes of boiling because the mixture had started to carbonize. On diluting with 20 ml. of water, a black tar-like residue separated. It was filtered and made alkaline with 5 percent sodium hydroxide. An ether extract of this mixture gave a gummy product which was converted into a hydrochloride. The hygroscopic solid was recrystallized from propanol and absolute ether. M.P. 174–176° C.

*Analysis.*—Calcd. for $C_{11}H_{18}ClNO_3$: C, 53.33; H, 7.27; Cl, 14.34; N, 5.65. Found: C, 53.19; H, 7.54; Cl, 14.53; N, 5.87.

EXAMPLE 10

*N-Methyl-Omega-Mesityl-Omega',Omega"-Dihydroxy-Tert.-Butylamine Hydrochloride*

To the sodium salt of ethyl formylaminomalonate (33.3 grams) in 400 cc. of absolute alcohol, chloromethyl mesitylene (48.2 grams) was added portionwise, and the mixture refluxed for 3 hours. The mixture was filtered hot and ethanol was removed from the filtrate under reduced pressure. The solid product was dissolved in a minimum quantity of ethanol, filtered, cooled and precipitated with water. It was dried in a vacuum over phosphorus pentoxide. The product, ethyl α-formylamino-α-carbethoxy-β-mesityl propionate, was recrystallized from absolute ethanol, melting from 158–160° C.

*Analysis.*—Calcd. for $C_{18}H_{25}O_5N$: C, 64.47; H, 7.46; N, 4.17. Found: C, 64.68; H, 7.75; N, 4.30.

In a 1 liter three-necked, round-bottom flask, equipped with a stirrer, a condenser protected from atmospheric moisture, and a controlled powder addition funnel, was placed 250 cc. of anhydrous ether and 7.7 grams (0.201 mole) of lithium aluminum hydride. It was stirred for half an hour. Then with stirring 22.0 grams (0.065 moles) of ethyl α-formylamino-α-carbethoxy-β-mesityl propionate was added portionwise from the controlled powder addition funnel during 45 minutes. It was then refluxed with stirring on a steam bath for 5 hours. The reaction mixture was cooled and decomposed with an excess of water. The ether layer was separated and the aqueous layer was extracted with five 100 cc. portions of ether. The combined extracts were dried over sodium sulfate and the ether was then removed under reduced pressure. This residue dissolved in absolute ether was cooled in an ice bath and dry hydrogen chloride was passed into the solution. The precipitate which formed was filtered and recrystallized from 100 cc. of methyl alcohol. The white solid, dried in a vacuum, melted at 230–232° C.

*Analysis.*—Calcd. for $C_{14}H_{24}O_2NCl$: C, 61.44; H, 8.77; N, 5.11; Cl, 12.09. Found: C, 61.53; H, 9.07; N, 4.73; Cl, 13.04.

All of the compounds have demonstrated pharmacological action and, in particular, a tranquilizing action. In addition, some of the compounds, for example, the unsubstituted phenyl (Example 3), the p-chlorophenyl (Example 8) and the furyl (Example 1) compounds show stimulating action while the p-methylphenyl and the 3,4,6-trimethylphenyl compounds show anti-convulsant action. Moreover, the compounds may be converted, by reaction with freshly distilled thionyl chloride at room temperature, to the corresponding tert.butylaminesulfites, also demonstrating tranquilizing action. All of the phenyl and substituted phenyl dihydroxy compounds have the still additional utility for conversion into the compounds of United States Patents Nos. 2,590,079 and 2,597,446 by simple chlorination of the two hydroxymethyl groups to two chloromethyl radicals followed by a reduction to the compounds disclosed in these patents.

We claim:
1. A compound of the group consisting of an amino base and its pharmacologically acceptable acid-addition salts, said base having the formula

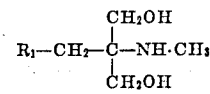

wherein $R_1$ is a radical of the group consisting of furyl, phenyl and substituted phenyl, the substituents being selected from the group consisting of lower alkyl, lower alkoxy, chlorine, hydroxy and unsubstituted amine radicals.

2. The compound, N-methyl-omega-phenyl-omega', omega"-dihydroxy-tert.butyl amine.

3. The compound, N-methyl-omega-2,4,6-trimethylphenyl-omega',omega"-dihydroxy-tert.butyl amine.

4. The compound, N-methyl-omega-p-chlorophenyl-omega',omega"-dihydroxy-tert.butyl amine.

5. The compound, N-methyl-omega-furyl-omega',omega"-dihydroxy-tert.butyl amine.

6. The compound, N-methyl-omega-o-tolyl-omega', omega"-dihydroxy-tert.butyl amine.

References Cited in the file of this patent

UNITED STATES PATENTS 2,547,712    Long et al. _____ Apr. 3, 1951

FOREIGN PATENTS 673,864    Great Britain _____ June 11, 1952

OTHER REFERENCES

Ruoff: J. Amer. Chem. Soc., vol. 72 (1950), pages 1417–19.

Hayes: J. Org. Chem., vol. 16 (1951), page 269.

Rebstock: J. Amer. Chem. Soc., vol. 73 (1951), pages 3671–4.

Collins et al.: Chem. Abst., vol. 47 (1953), columns 6896–8. [Abstract of J. Pharm. and Pharmocology, 4 (1952), pages 693–710.]